United States Patent
Fang et al.

(10) Patent No.: US 12,507,112 B2
(45) Date of Patent: Dec. 23, 2025

(54) OPTIMIZATION OF VIRTUAL QUALITY OF SERVICE NETWORK

(71) Applicant: T-Mobile USA, Inc., Bellevue, WA (US)

(72) Inventors: Zheng Fang, McLean, VA (US); George Jason Schnellbacher, Leawood, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 313 days.

(21) Appl. No.: 18/314,504

(22) Filed: May 9, 2023

(65) Prior Publication Data

US 2024/0381160 A1 Nov. 14, 2024

(51) Int. Cl.
*H04W 28/02* (2009.01)
*H04L 47/26* (2022.01)
*H04W 24/02* (2009.01)

(52) U.S. Cl.
CPC ......... *H04W 28/0247* (2013.01); *H04L 47/26* (2013.01); *H04W 24/02* (2013.01)

(58) Field of Classification Search
CPC ............. H04W 28/0247; H04W 24/02; H04W 28/0268; H04L 47/26
USPC ........................................................ 370/235
See application file for complete search history.

(56) References Cited

U.S. PATENT DOCUMENTS

| | | |
|---|---|---|
| 6,587,684 B1 | 7/2003 | Hsu et al. |
| 7,072,961 B1 | 7/2006 | Maclean et al. |
| 7,162,507 B2 | 1/2007 | Carter |
| 7,299,039 B2 | 11/2007 | Lee et al. |
| 7,330,453 B1 | 2/2008 | Borella et al. |
| 7,502,855 B2 | 3/2009 | Swanson et al. |
| 7,616,598 B2 | 11/2009 | Chang et al. |
| 7,747,255 B2 | 6/2010 | Dacosta et al. |
| 8,135,382 B1 | 3/2012 | Green et al. |
| 9,088,936 B2 | 7/2015 | Zisimopoulos et al. |
| 9,565,615 B2 | 2/2017 | Bharadwaj et al. |
| 9,755,882 B2 | 9/2017 | Jain et al. |
| 9,973,542 B2 | 5/2018 | Dowlatkhah et al. |
| 10,212,639 B2 | 2/2019 | Kodaypak |

(Continued)

FOREIGN PATENT DOCUMENTS

WO WO-2023048628 A1 * 3/2023 ........ H04W 28/0289

*Primary Examiner* — Khaled M Kassim
*Assistant Examiner* — Oladiran Gideon Olaleye
(74) *Attorney, Agent, or Firm* — Perkins Coie LLP

(57) ABSTRACT

A 5G server system establishes a wireless connection between a wireless device and a data network (DN) subsystem through a network slice. A user plane function (UPF) subsystem generates an aggregated wireless connection between the UPF subsystem and the DN subsystem by augmenting the wireless connection with additional network connections. The DN subsystem and the UPF subsystem transmit data packets from a Low Latency Low Loss Scalable Throughput (L4S) application server to the wireless device via the aggregated wireless connection. In response to a detection of the risk of reduced service performance, the system adds a notification to a respective data packet. The system causes the wireless device to forward a feedback message to the L4S application server upon receiving the notification. The system performs an action to prevent reduced service performance in response to receiving a request from the L4S application server.

20 Claims, 7 Drawing Sheets

(56) References Cited

U.S. PATENT DOCUMENTS

| | | |
|---|---|---|
| 10,652,159 B2 | 5/2020 | Meredith et al. |
| 11,496,929 B2 | 11/2022 | Afzal et al. |
| 2002/0025819 A1 | 2/2002 | Cetusic et al. |
| 2003/0210678 A1 | 11/2003 | Haukka |
| 2004/0136358 A1 | 7/2004 | Hind et al. |
| 2004/0193675 A1 | 9/2004 | Fillebrown et al. |
| 2005/0125547 A1 | 6/2005 | Ahonen |
| 2005/0170852 A1 | 8/2005 | Li et al. |
| 2006/0182061 A1 | 8/2006 | Naghian |
| 2006/0256752 A1 | 11/2006 | Svensson et al. |
| 2006/0268781 A1 | 11/2006 | Svensson et al. |
| 2007/0091862 A1 | 4/2007 | Ioannidis |
| 2007/0197227 A1 | 8/2007 | Naqvi et al. |
| 2012/0042396 A1 | 2/2012 | Guerra et al. |
| 2013/0136056 A1 | 5/2013 | Venkatraman et al. |
| 2020/0068430 A1* | 2/2020 | Chan ................. H04W 28/0284 |
| 2022/0264264 A1 | 8/2022 | Paczkowski |
| 2023/0344772 A1* | 10/2023 | Johansson ............... H04L 47/30 |
| 2025/0133023 A1* | 4/2025 | Östberg ............ H04W 28/0289 |
| 2025/0150402 A1* | 5/2025 | Östberg ................. H04L 47/33 |

\* cited by examiner

OPTIMIZATION OF VIRTUAL QUALITY OF SERVICE NETWORK

BACKGROUND

Quality of service (QOS) is a combination of technologies in a network that performs to guarantee the network's ability to reliably operate high-priority applications or data traffic under limited network capacity. QoS refers to a measure of the overall performance of a service, such as a wireless network service. QoS can involve prioritization of different applications, users, or data flows to manage the performance of the network and meet required reliability standards. For example, a network administrator can assign an order in which data packets are handled and an amount of bandwidth afforded to that application or data flow. A particular level of QoS can be achieved by prioritization of data flows as well as control of resource reservation mechanisms.

QoS is related to multiple aspects of wireless network service including packet loss, bit rate, throughput, transmission delay, and jitter. For example, packet loss refers to the rate of failure for the network to deliver data packets to their destination while bit rate refers to the number of bits per second that the network can transmit. Throughput is a measure of the actual rate of data packet transfer. Transmission delay (or latency) measures the amount of time it takes for a data packet to traverse from the source to its destination through the network. Jitter is a measure of variance in latency referring to packets arriving in a different order than they were sent. These multiple aspects have significance for operating a reliable wireless network.

BRIEF DESCRIPTION OF THE DRAWINGS

Detailed descriptions of implementations of the present invention will be described and explained through the use of the accompanying drawings.

Figure 1:
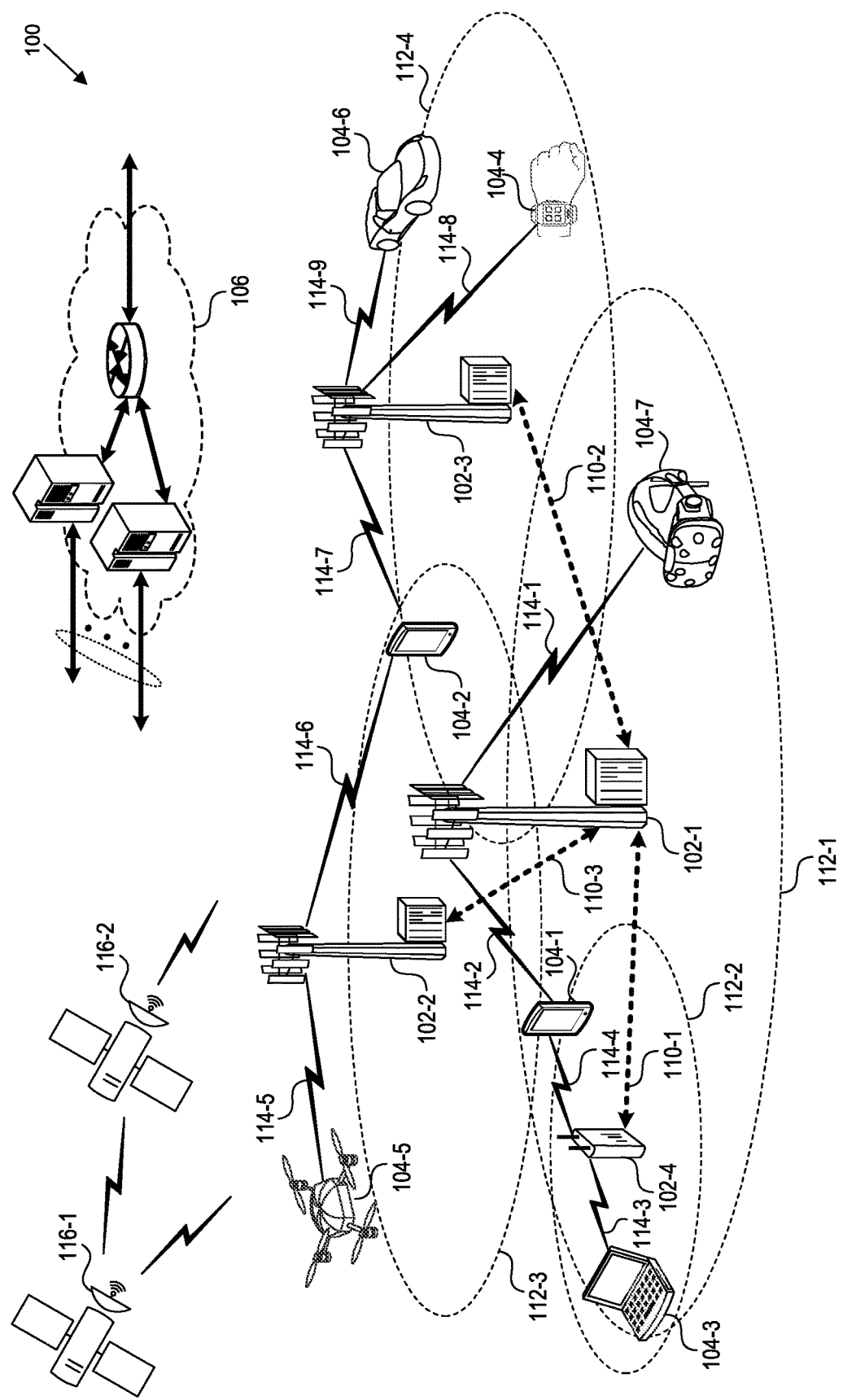
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates to virtual (e.g., software-based) QoS methods for optimizing the reliability of 5G network connections. The methods can be configured for serving wireless devices for specialized applications that require high-reliability network services. Such applications can include, for example, autonomous transportation, remotely operated specialty robotics, augmented or virtual reality (AR/VR) equipment, or security systems. The methods combine the use of a data packet throughput management application (e.g., a Low Latency Low Loss Scalable Throughput (L4S) application) in a 5G wireless network combining bandwidth aggregation and network slicing at 5G core network functions (e.g., non-3GPP Interworking Function (N3WIF)). The methods allow a QoS system to receive indications of possible slowdowns at a 5G network connection using the L4S technology, and adjust the bandwidth of the 5G network connection by increasing a number of network slices and/or adjusting the data flow through different network connections using the bandwidth aggregation technology.

In one example, a 5G server system can associate a first network slice of a 5G telecommunications network with a wireless device and establishes a 5G wireless connection between a wireless device and a data network (DN) subsystem of the 5G server system. The 5G wireless connection between the wireless device and the DN subsystem can be through the first network slice. A user plane function (UPF) subsystem of the 5G network server system can generate an aggregated wireless connection between the UPF subsystem and the DN subsystem. The aggregated wireless connection is generated by augmenting the 5G wireless connection with one or more additional network connections. The DN subsystem and the UPF subsystem can transmit data packets received from a Low Latency Low Loss Scalable Throughput (L4S) application server to the wireless device via the aggregated wireless connection and the 5G wireless network. The 5G server system can detect that the 5G wireless connection has a risk of experiencing reduced service performance. In response to the detection of the risk of experiencing reduced service performance, the DN subsystem or the UPF subsystem can add an explicit congestion notification (ECN) to a respective data packet of the data packets. The 5G server system can cause the wireless device to forward a feedback message to the L4S application server in response to receiving the respective data packet including the ECN. The 5G server system can receive a request from the L4S application server to perform an action to prevent reduced service performance in the 5G wireless connection. The 5G server system can perform the action by the 5G server system in response to receiving the request from the L4S application server.

In another example, a 5G server system can associate a first network slice of a 5G telecommunications network with a wireless device. The 5G server system can establish a 5G wireless connection between the wireless device and a data network (DN) subsystem of the 5G server system. The 5G wireless connection between the wireless device and the DN subsystem can be established through the first network slice. The DN subsystem and a user plane function (UPF) subsystem of the 5G server system can transmit data packets received from a Low Latency Low Loss Scalable Throughput (L4S) application server to the wireless device via the 5G wireless connection. The 5G server system can detect that the 5G wireless connection has a risk of experiencing reduced service performance. In response to the detection of the risk of experiencing reduced service performance, the DN subsystem or the UPF subsystem can add an explicit congestion notification (ECN) to a respective data packet of the data packets. The 5G server system can cause the wireless device to forward a feedback message to the L4S application server in response to receiving the respective data packet including the ECN. The 5G server system can receive a request from the L4S application server to perform an action to prevent reduced service performance in the 5G wireless connection.

In yet another example, a server system for optimizing a telecommunications network reliability can include a DN subsystem and a UPF subsystem. The server system can associate a first network slice of a telecommunications network with a wireless device. The server system can establish a wireless connection between the wireless device and the DN subsystem. The wireless connection between the wireless device and the DN subsystem can be established through the first network slice. The UPF subsystem can generate an aggregated wireless connection between the UPF subsystem and the DN subsystem. The aggregated wireless connection can be generated by augmenting the wireless connection with one or more additional network connections. The DN subsystem and the UPF subsystem DN can transmit data packets received from an application server associated with a data packet throughput management system to the wireless device via the aggregated wireless connection and the wireless network. The server system can detect that the wireless connection has a risk of experiencing reduced service performance. In response to the detection of the risk of experiencing reduced service performance, the DN subsystem or the UPF subsystem can add a congestion indication to a respective data packet of the data packets. The server system can cause the wireless device to forward a feedback message to the application server in response to receiving the respective data packet including the congestion indication. The server system can receive a request to perform an action to prevent reduced service performance in the wireless connection from the application server. The server system can perform the action by the server system in response to receiving the request from the application server.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 service provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network

Figure 2:
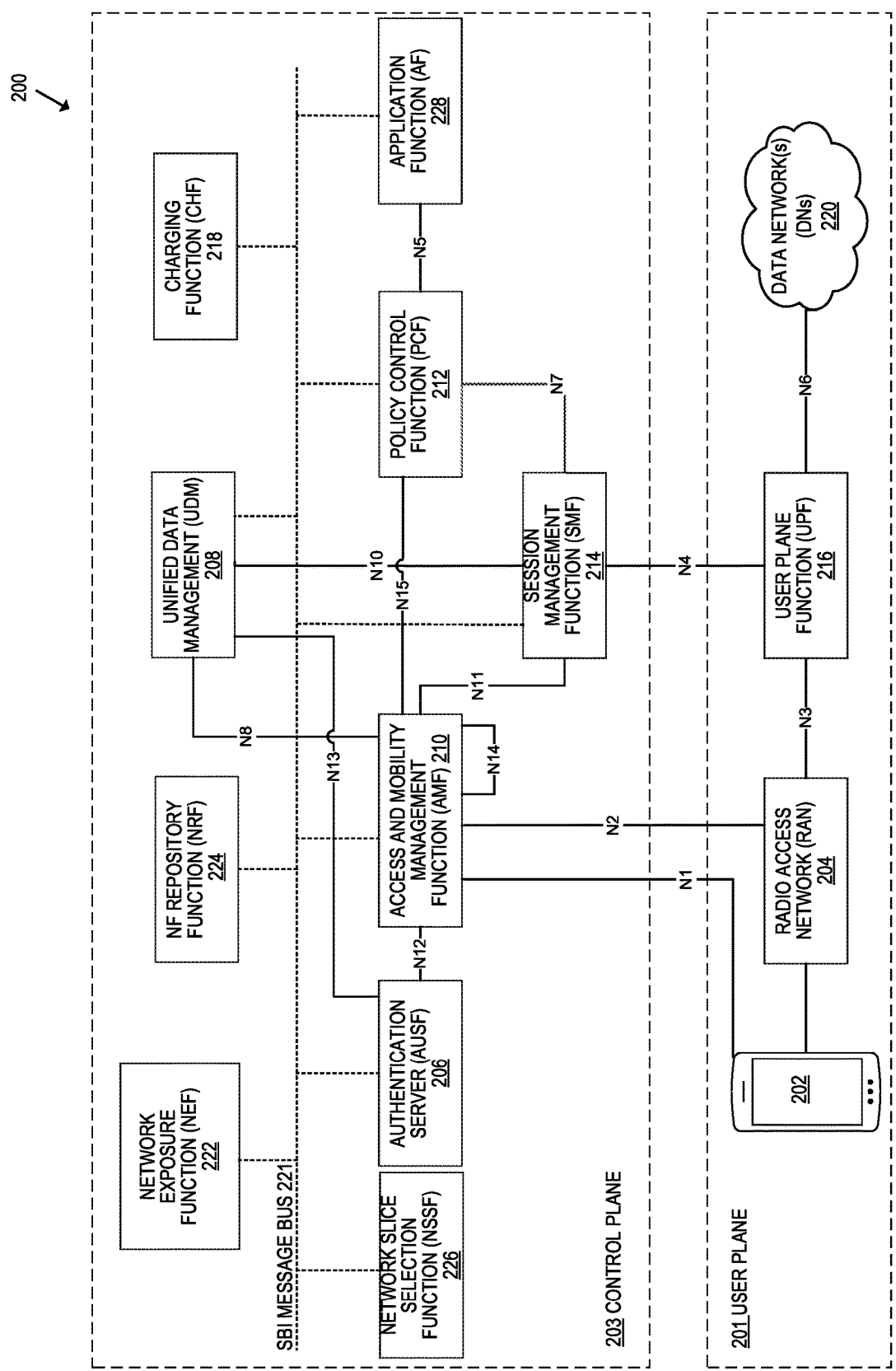
FIG. 2 is a block diagram that illustrates 5G core network functions (NFs) that can implement aspects of the present technology.

FIG. 2 is a block diagram that illustrates system 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218. The UPF 216, DNs 220, and RAN 204 belong to a user plane 201 while the other NFs belong to a control plane subsystem 203 of the system 200.

The interfaces N1 through N15 define communications and/or protocols between each NF as described in relevant standards. The UPF 216 is part of the user plane 201 and the AMF 210, SMF 214, PCF 212, AUSF 206, and UDM 208 are part of the control plane subsystem 203. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Network Slicing System

Figure 3:
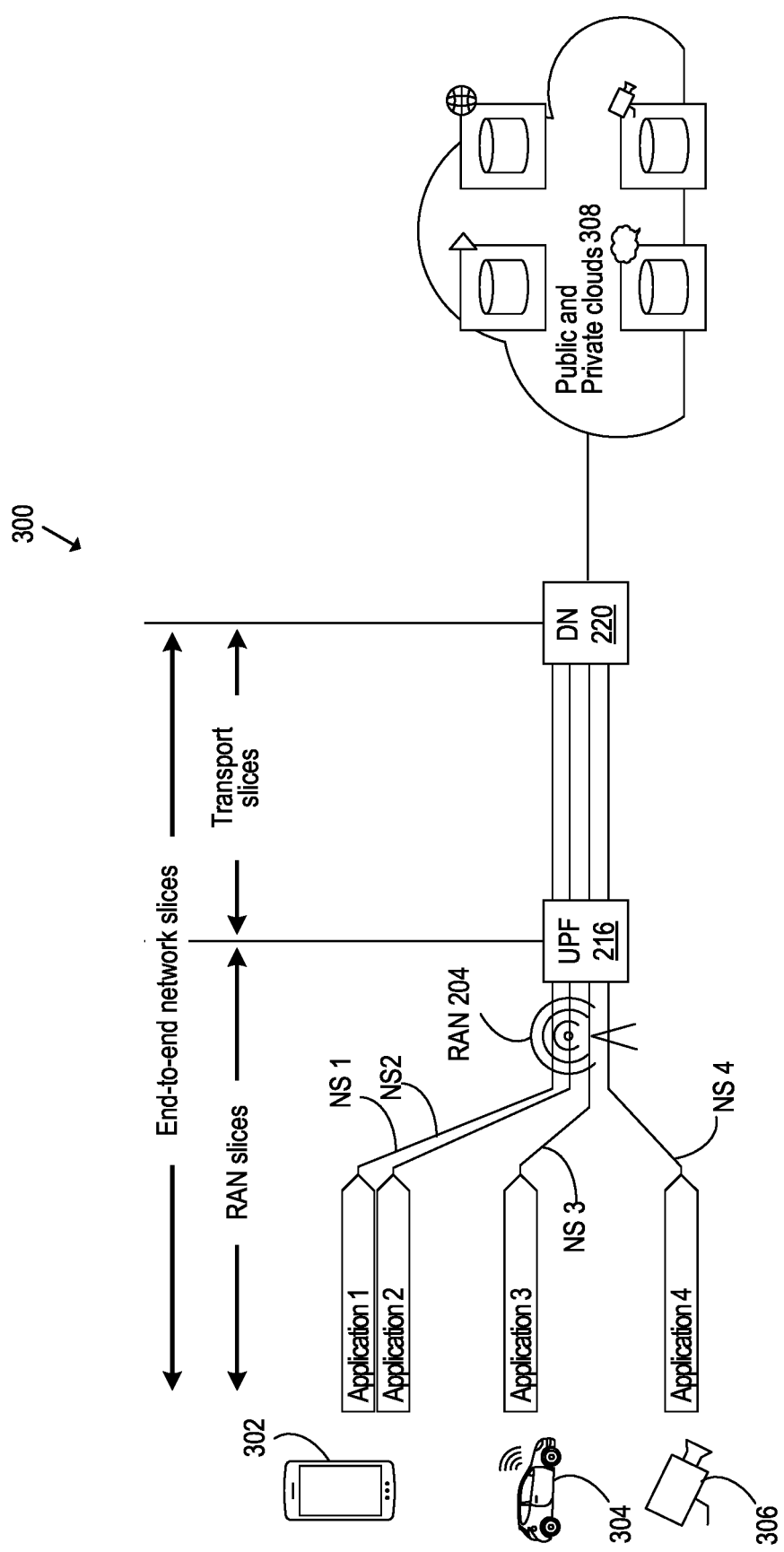
FIG. 3 is a block diagram that illustrates network slicing in a 5G network.

FIG. 3 is a block diagram that illustrates an example network slicing system 300 in a 5G network. The network slicing system 300 enables multiplexing of virtualized and independent logical networks (i.e., network slices NS1 through NS2) on the same physical network infrastructure. In 5G wireless networks, network slicing assumes a central role designed to efficiently embrace multiple services with very different service-level requirements (e.g., data transfer speed, reliability, bandwidth). The end-to-end network slices can be defined between wireless devices (e.g., wireless devices 302, 304, and 306) and DN 220. For example, each network slice is an isolated end-to-end network tailored to fulfill diverse requirements requested by a particular application (e.g., wireless applications 1 through 4 associated with the wireless devices 302, 304, and 306). The network slicing system 300 can be in communication with public and private clouds 308. For example, the clouds 308 can include cloud servers associated with the different wireless applications 1 through 4.

An infrastructure associated with the network slicing system includes hardware and software resources, such as user equipment and/or compute-, storage- and networking-hardware equipment, as well as the services and software programs stored thereof. The infrastructure can be used to implement physical network nodes and/or to define a distributed cloud environment, such as Physical Network Functions (PNFs) and/or the Network Functions Virtualization Infrastructure (NFVI). The infrastructure provides the support and management functionality that allows for the deployment and operation of individual network slices. The network function/logical network stratum 303 includes a collection of PNFs. It provides the user control and application plane functionality across the different network segments, including the RAN slices between wireless devices (e.g., wireless devices 302, 304, and 306) and the UPF 216 and transport slices between the UPF 216 and DN 220.

L4S System

Figure 4:
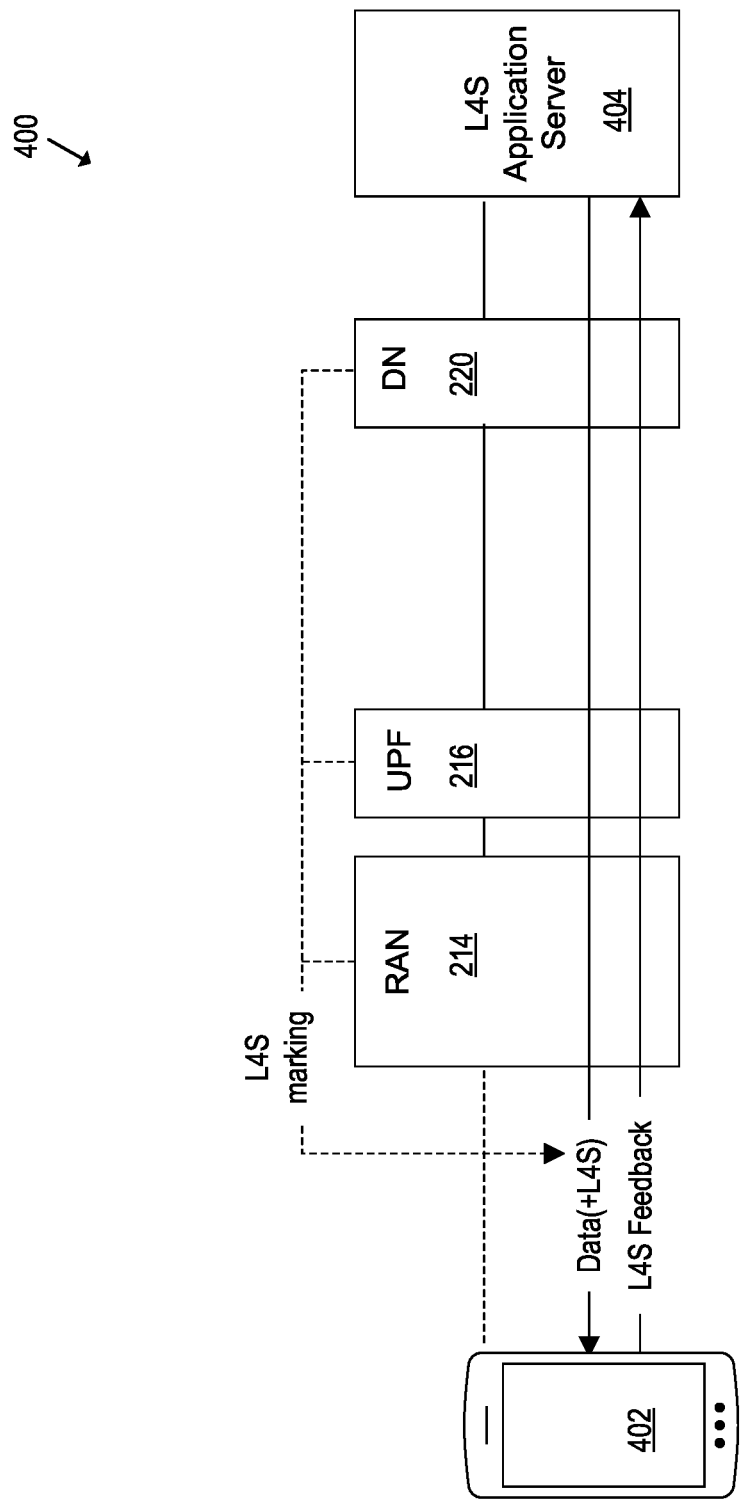
FIG. 4 is a block diagram that illustrates Low Latency Low Loss Scalable Throughput (L4S) technology in a 5G network.

FIG. 4 is a block diagram that illustrates an example L4S system 400 in a 5G wireless network. L4S system 400 is a type of data packet throughput management system. L4S refers to a technology providing high throughput and low latency for internet protocol (IP) data traffic. L4S aims to reduce queue delay issues in data transfer without loss of IP packets between an L4S application server 404 and a wireless device 402 via a 5G wireless network (e.g., via a wireless connection established between the DN 220, UPF 216, and RAN 204). L4S reduces queue delays by adding or modifying Explicit Congestion Notifications (ECNs) to IP packets upon detection of a risk of a slowdown. ECN allows for end-to-end notifications of network congestion to prevent packet losses. The ECN can include a bit marker in a header of a data packet. For example, a bit code (11) in the header of a data packet can operate as an indicator that the network connection is detecting a slowdown while a bit code (01) can indicate that no slowdown is detected. The L4S system 400 can be configured to support communication using a variety of communication protocols including User Datagram Protocol (UDP), Transmission Control Protocol (TCP), Stream Control Transmission Protocol (SCTP), or QUIC-transport layer protocol.

For example, in FIG. 4 the L4S application server 404 forwards data packets (e.g., UP packets) to the wireless device 402 via the DN 220, UPF 216, and RAN 204. When the 5G network detects a risk of a slowdown, the UPF 216 or the DN 220 can add an ECN to a respective data packet. Upon receiving the data packet, the wireless device forwards L4S feedback indicating that there is a risk of a slowdown to the L4S application server 404. The L4S application server 404 can perform an action in response to the L4S feedback to prevent the slowdown of the 5G network connection. The L4S system can be applied to data transmitted from the L4S application server 404 to the wireless device 402 as well as data transmitted from the wireless device 402 to the L4S application server 404. In FIG. 4, the data transmission is illustrated through a 5G network. However, the L4S technology can be similarly applied to other networks such as wireless local area networks (WLAN), or Data Over Cable Service Interface Specification radio guide (DOCSIS RG) networks.

QoS System for Optimization of Network Reliability

Figure 5:
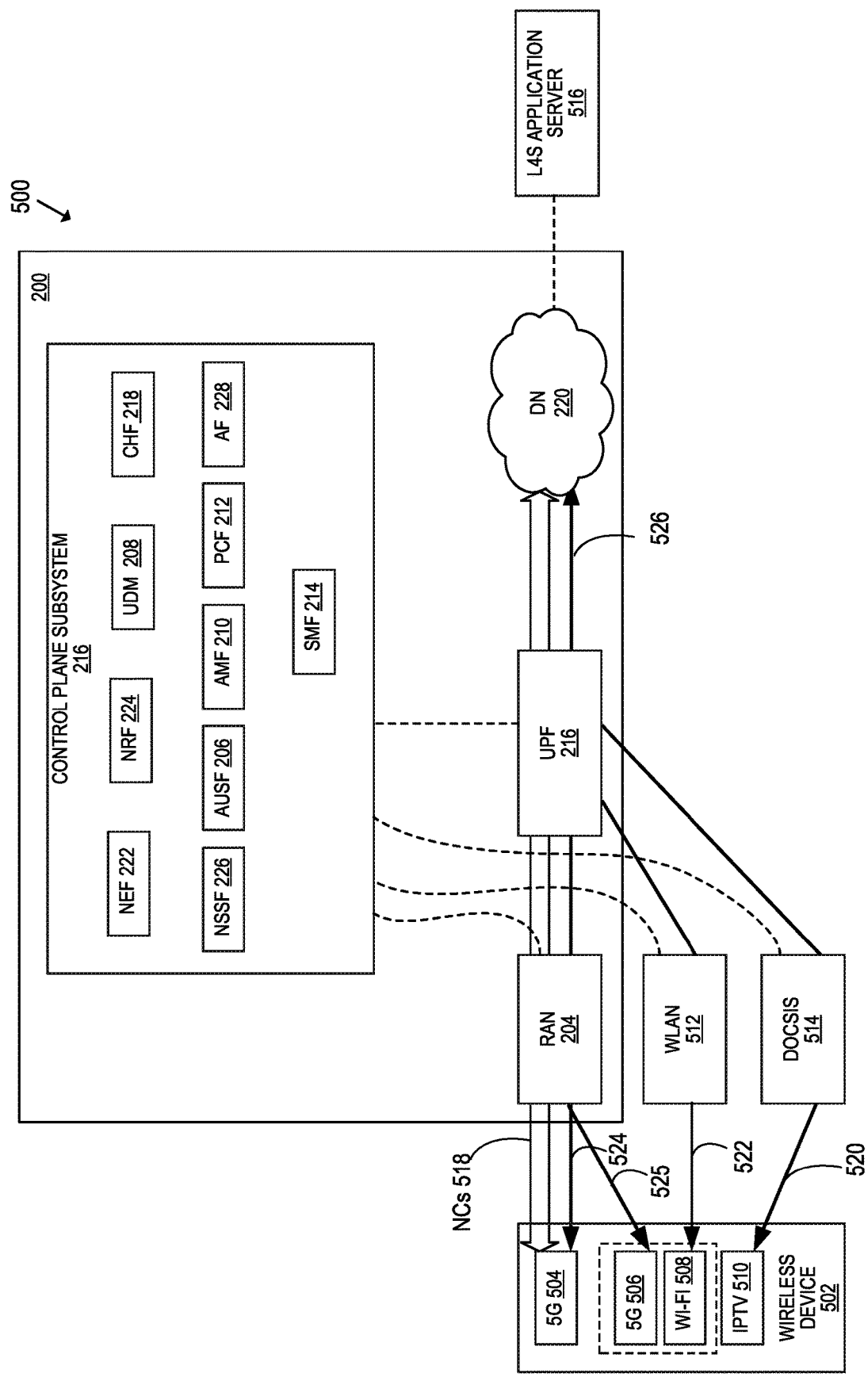
FIG. 5 is a block diagram that illustrates optimization of QoS operations in a 5G network.

FIG. 5 is a block diagram that illustrates a QoS system 500 for optimizing the reliability of wireless service. The system 500 is configured to combine two or three technologies selected from bandwidth aggregation, network slicing (e.g., as described with respect to FIG. 3), and L4S (e.g., as described with respect to FIG. 4) in a 5G wireless network (e.g., as described with respect to FIG. 2). In FIG. 2, the system 500 includes the 5G wireless network system 200 including the control plane subsystem 203 in communication with the RAN 204, the UPF 216, and the DN 220. The 5G wireless network is in communication with a wireless device 502 and an L4S application server 516. The 5G wireless network system 200 can also be in communication with one or more network access points that are distinct from the RAN 204. For example, the 5G wireless network system 200 can be in communication with a wireless local area network access point (WLAN AP) 512, or Data Over Cable Service Interface Specification radio guide (DOCSIS RG) node 514. In some implementations, the system 500 uses N3IWF technology for linking together the 5G wireless network system 200 and non-3GPP standard networks.

The wireless device 502 can be associated with an application or task requiring high-reliability wireless network services. For example, the wireless device 502 can be configured to perform tasks, e.g., by autonomously or remotely operated devices, where a failure of the wireless device could cause serious disturbance in the operation. In order to ensure the reliable operation of such devices, a user or a party operating such devices can purchase a high-reliability QoS network connection from a service provider associated with the system 500. In some implementations, the wireless device 502 is a handheld mobile device (e.g., a smartphone, portable hotspot, tablet, etc.), a laptop, a wearable device (e.g., a smartwatch), an unmanned aerial vehicle (e.g., a drone), an autonomous transportation device (e.g., an autonomous car, bus, truck, airplane, helicopter, water vehicle or train), a robotic device (e.g., a medical robot such as a surgical robot), an AR/VR device (e.g., for entertainment, metaverse applications, gaming applications, or military applications) or a security system device. The wireless device 502 can, for example, correspond to any of the wireless devices 104-1 through 104-7 described with respect to FIG. 1.

As an example, a failure (e.g., a slowdown or loss of data) of a wireless network when operating autonomous or remotely operated vehicles could disturb the usage of location detection or map applications while the vehicle is in operation thereby causing a risk of serious harm. Similarly, a failure of a remotely operated surgical robotic can cause a significant risk for a patient if occurring during a surgical operation. A wireless network failure can also significantly decrease a user's enjoyment of an AR/VR experience.

The wireless device 502 includes multiple network interface devices for connecting with different types of wireless networks. The network interface devices enable the wireless device to mediate data in a network with an entity that is external to the wireless device through different communication protocols supported by the wireless device and the external entity. The network interface devices can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network interface devices can include, or be in communication with, subscriber identity modules (e.g., subscriber identity module (SIM) cards) of the wireless device 502. For example, the wireless device includes 5G network interface devices 504 and 506 configured to communicate with the RAN 204 (e.g., via wireless network connections 524 and 525), a Wi-Fi (or alternatively Ethernet) network interface device 508 configured to communicate with WLAN 512 (e.g., via a wireless connection 522), and an Internet Protocol Television (IPTV) network interface device 510 (e.g., the network connection 520). The 5G network interface devices 504 and 506 can be associated with different telecommunications network service providers. For example, the 5G network interface device 504 is associated with the telecommunications network service provider associated with the 5G network system 200 while the 5G network interface device 506 is associated with a different telecommunications network service provider (e.g., the wireless device 502 can receive two SIM cards associated with different network service providers). The wireless device 502 can be configured to communicate with the different wireless network access nodes (e.g., the RAN 204, the WLAN 512, and the DOCSIS 514) concurrently.

In addition to the functions performed by the UPF 216 described with respect to FIG. 1, the UPF 216 can be configured to perform bandwidth aggregation. Bandwidth aggregation (also referred to as link aggregation) refers to a method of combining multiple wireless network connections in parallel to increase total throughput beyond a single connection throughput. For example, in FIG. 5 the UPF 216 of system 500 is configured to combine the 5G wireless network connections 524 and 525, the Wi-Fi connection 522, and the IPTV network connection 520 to establish an aggregated wireless connection 526 between the UPF 216 and the DN 220. The aggregated wireless connection 526 enabled by the system 500 thereby provides for increased bandwidth between the UPF 216 and the DN 220 compared to a bandwidth provided by any single connection of the network connections 524, 525, 522, and 520.

The system 500 is also configured to perform network slicing in the 5G wireless network connection 524 between the wireless device 502 and the DN 220 (e.g., network slices 518 corresponding to NS1 through NS4 in FIG. 3). As described with respect to FIG. 2, the NSSF 226 can be configured to associate the wireless device 502 with one or more network slices between the 5G wireless network connections 524 and 525. The NSSF 226 can associate the wireless device 502 with one or more network slices that the wireless device 502 is authorized to be associated with. The authorization can be based on the subscriber information of a user associated with the wireless device 502. The subscriber information can define a number or a type of network slices that the wireless device 502 is authorized to connect with. For example, the subscriber information of the user associated with the wireless device 502 is stored and managed by the UDM 208. Prior to associating the wireless device 502 with one or more network slices, the NSSF 226 inquires for authorization from the UDM 208.

The system 500 is also configured to perform data packet throughput management based on, for example, the L4S technology. The L4S application server is in communication with the DN 220 and is configured to forward data packets to, and receive data packets and L4S feedback data from, the wireless device 502. For example, the wireless device 502 operates an instance of a software application associated with the L4S application server. The instance of the software application can be configured to receive the data packets from the L4S application server, generate L4S feedback messages in accordance with the received data packets (e.g., based on whether or not the data packets include ECNs), and send the L4S feedback messages to the L4S application server 516. The L4S-based communication between the L4S application server 516 and the wireless device 502 is through the aggregated wireless connection 522 between the DN 220 and the UPF 216 and through one or more of the network connections 524, 525, 522, and 520 between the UPF 216 and the wireless device 502.

The operations and communications of the system 500 can be enabled by a variety of relevant standards. The relevant standards can include one or more of ATIS/3GPP/NA3, ETSI/3FPP, Wireless Broadband Alliance Ltd. Standards, WFA, Linux Foundation, and Linux networking.

Figure 6:
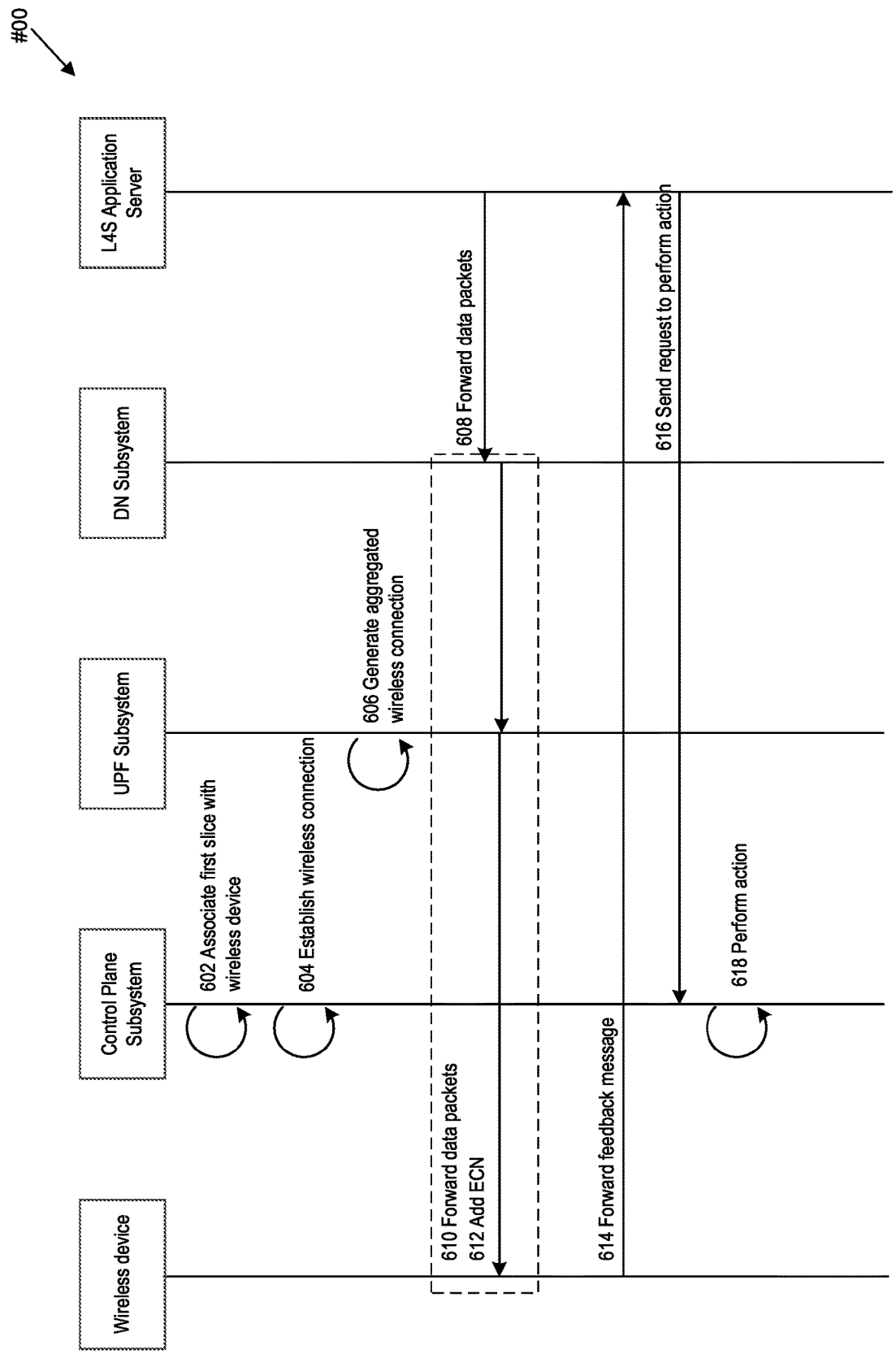
FIG. 6 is a sequence diagram that illustrates processes for optimization of QoS operations in a 5G network.

FIG. 6 is a sequence diagram that illustrates processes 600 for optimization of QoS operations in a 5G network for network reliability. The processes 600 can be performed by a QoS system (e.g., the system 500 in FIG. 5). The system includes the 5G core network including a control plane subsystem (e.g., the control plane subsystem 203), a UPF subsystem (e.g., the UPF 216), a DN subsystem (e.g., the DN 220), a wireless device (e.g., the wireless device 202) and an L4S application server (e.g., the L4S application server 516). The system can be associated with a telecommunications network and include at least one hardware processor and at least one non-transitory memory-storing instructions (e.g., as described with respect to a computer system 700 in FIG. 7). When the instructions are executed by the at least one hardware processor, the system performs the processes 600. In some implementations, the QoS system is configured for providing 5G wireless network services for high-priority applications or data traffic. Such high-priority services can require, for example, higher than 99% reliability at a given performance level. In some implementations, the wireless device is a mobile device, a laptop, a wearable device, an unmanned aerial vehicle (e.g., a drone), an autonomous transportation device, a robotic device, an AR/VR device, or a security system device.

At 602, the control plane subsystem of a 5G wireless network server system (e.g., the NSSF 226 of the control plane subsystem 203 in FIG. 2) can associate a first network slice of a 5G telecommunications network with the wireless device. For example, the system 500 in FIG. 5 can support multiplexing of virtualized and independent logical networks (i.e., network slices 518 in FIG. 5) between the wireless device 502 (e.g., the 5G network interface device 504) and the DN 220 of the 5G wireless network system 200). The association can include determining the number or type of network slices that the wireless device is authorized to communicate with based on service subscription information associated with a user of the wireless device. For example, prior to associating the first network slice of the 5G telecommunications with a wireless device, the control plane subsystem (e.g., the UDM 208 in FIG. 5) can determine whether the wireless device is authorized to communicate through the first network slice based on a service subscription associated with a user of the wireless device.

At 604, the control plane subsystem establishes a 5G wireless connection between a wireless device and the DN subsystem of the 5G wireless network system (e.g., a wireless connection between the wireless device 502 and the DN 220 via the RAN 204 and the UPF 216 in FIG. 5). The 5G wireless connection between the wireless device and the DN subsystem is through the first network slice. In some implementations, the control plane subsystem associates two or more network slices with the wireless device and establishes a 5G wireless connection between the wireless device and the DN subsystem through the two or more network slices. For example, the wireless device can communicate with the DN subsystem of the 5G wireless network system through the two or more network slices, concurrently.

At 606, the UPF subsystem can generate an aggregated wireless connection between the UPF subsystem and the DN subsystem. For example, the UPF 216 can generate the aggregated wireless connection 522 based on the bandwidth aggregation technology described with respect to FIG. 5. The aggregated wireless connection is generated by augmenting the 5G wireless connection with one or more additional network connections.

In some implementations, the one or more additional network connections are selected from an additional 5G wireless connection (e.g., the 5G wireless connection 524), a Wi-Fi or Ethernet wireless connection (e.g., the Wi-Fi or Ethernet wireless connection 522), or an IPTV connection (e.g., the IPTV network connection 520).

In some implementations, the wireless device can include a first network interface (e.g., the network interface device 504) and a second network interface (e.g., any of the network interface devices 506, 508, or 510). The first network interface can be configured to communicate with the UPF subsystem via a 5G RAN node. The second network interface can be configured to communicate with the UPF subsystem via the 5G RAN node, WLAN AP, or DOCSIS RG node.

At 608, the L4S application server e.g., the L4S application server 516 in FIG. 5) can forward data packets to the DN subsystem (e.g., the DN 220). At 610, the DN subsystem and the UPF subsystem can transmit data packets received from the L4S application server to the wireless device via the aggregated wireless connection and the 5G wireless network. In some implementations, the DN subsystem and the UPF subsystem can transmit data packets received from the L4S application server to the wireless device via the aggregated wireless connection. The DN subsystem and the UPF subsystem can also transmit data packets received from the L4S application server to the wireless device via the one or more additional network connections concurrently with transmitting the data packets via the aggregated wireless connection and the 5G wireless network. In some implementations, the data packets received from the L4S application server can be transmitted through the aggregated wireless connection from the DN subsystem to the UPF subsystem and via the 5G wireless network from the UPF subsystem to the wireless device.

For example, the DN subsystem forwards the data packets to the UPF via the aggregated network connection (e.g., the aggregated wireless connection 526). For example, in FIG. 5 the UPF 216 can further forward the data packets to the wireless device (e.g., the wireless device 502) via the 5G wireless network connections 524 and 525, the Wi-Fi network connection 522, and the IPTV network connection 520. For example, the UPF 216 can concurrently forward a first portion of the data packets via the 5G wireless network connection 524, a second portion of the data packets via the 5G wireless connection 525, a third portion of the data packets via the Wi-Fi network connection 522, and a fourth portion of the data packets via the IPTV network connection 520.

The control plane subsystem can detect that the 5G wireless connection has a risk of experiencing reduced service performance. For example, an application server (e.g., the L4S application server 516 in FIG. 5) can detect a degradation of its application due to a network condition and request a modification of network slices through the NEF 222 (e.g., as shown in FIG. 2). The NEF in turn relays the request to the NSSF 226 In response to the detection of the risk of experiencing reduced service performance, at 612 the DN subsystem or the UPF subsystem can modify an ECN to a respective data packet of the data packets. The ECN can also be modified by a relevant gNB or a transport network. In some implementations, modifying the ECN to the respective data packet of the data packets can include modifying a marker including a particular bit code to a header of the respective data packet. For example, modifying the ECN includes modifying a bit code (marker) included in the heading of a data packet to indicate that the 5G wireless network system has detected a risk a slowdown (e.g., as described with respect to FIG. 4). In contrast, in an instance that the 5G wireless connection has not detected the risk of experiencing reduced service performance, modifying the ECN includes modifying a bit code in the heading of the data packet to indicate that the 5G wireless network system has not detected any risks of a slowdown.

At 614, in response to receiving the respective data packet with the ECN, the wireless device can forward a feedback message to the L4S application server in response to receiving the respective data packet including the ECN. The content of the feedback message correlates with the status of the 5G wireless network operation included in the ECN. For example, in an instance that the ECN includes a bit code that indicates a risk of reduced service performance or existing reduced service performance, the L4S feedback message includes an indication of a possible slowdown at the 5G wireless network. In contrast, in an instance that the ECN includes a bit code that indicates no risks of slowdown (or any indication of a slowdown), the L4S message includes an indication that the 5G wireless network is operating at a regular state (no slowdowns). The acts 608, 610, and 612 are repeated continuously when the wireless device is downloading in order to report the operational status of the 5G wireless network in real time.

At 616, the L4S application server can send the control plane subsystem a request to perform an action to prevent reduced service performance in the 5G wireless connection. At 618, the control plane subsystem can perform the action by the control plane subsystem in response to receiving the request from the L4S application server. For example, the L4S application server sends the request to the NSSF 226 of the control plane subsystem 203, and the NSSF 226 performs an action in response to the request.

In some implementations, the request from the L4S application server can include a request to associate one or more additional network slices with the wireless device. In response to the request, the action performed by the control plane subsystem can include associating a second network slice with the wireless device by the control plane subsystem so that the 5G wireless connection between the wireless device and the DN subsystem is through the first network slice and the second network slice.

For example, in order to prevent the reduced service performance of packet delivery through the first network slice of the 5G network connection or through the aggregated network connection, the NSSF 226 can associate one or more additional 5G network slices with the wireless device 502 so that the 5G wireless network connection between the wireless device and the DN subsystem can be established through the first network slice and the one or more additional 5G network slices. The association of the one or more additional 5G wireless network slices can increase the network bandwidth between the wireless device and the DN subsystem accordingly (e.g., including the aggregated wireless connection).

In some implementations, the action performed by the control plane subsystem can include determining whether the wireless device is authorized to establish a wireless connection with any additional network slices in addition to the first network slice. For example, in FIG. 5, the NSSF 226 sends a request to the UDM 208 to request whether the user associated with the wireless device 502 is authorized to establish a wireless connection through any additional network slices. The UDM 208 can determine whether the user is authorized based on subscription information associated with the user.

In some implementations, the action performed by the control plane subsystem can include determining whether any other additional network slices of the 5G telecommunications network have the bandwidth to transfer data packets without the risk of causing a reduced performance at the additional network slices.

In some implementations, the action performed by the control plane subsystem can include determining that the control plane subsystem cannot associate any additional network slices with the wireless device. The determination can be made, for example, when the user associated with the wireless device 502 is not authorized to be associated with any additional network slices or when the 5G wireless network has no bandwidth capacity to associate additional network slices with the wireless device 502. The determination can be based on or include prioritization of different wireless devices based on the subscription information of the respective users. For example, a user can contract with the service provider associated with the system 500 in FIG. 5 to have a particular level of prioritization over other users.

In response to the determination that the control plane subsystem cannot associate any additional network slices with the wireless device, the action includes forgoing associating the one or more additional network slices with the wireless device. In some implementations, in an instance that no additional network slices can be associated with the wireless device, the action can include reducing a portion of data packets routed through the 5G wireless network and increasing a portion of data packets routed through the one or more additional network connections by the UPF subsystem. For example, the UPF 216 of system 500 can send data packets concurrently through the different network connections 524, 525, 522, and 520. In an instance that no additional network slices can be associated with the wireless device 502, the UPF 216 can decrease a portion of data packets transmitted through the 5G wireless connection 524 and increase a portion of data packets transmitted through the network connections 525, 522, and/or 520. By such action, the system 500 can prevent the reduced service performance in the 5G wireless connection.

In an instance that the 5G wireless network has recovered from a reduced performance (e.g., the ECNs of the transmitted data packets indicate no issues within the network connection), the L4S application server 516 in FIG. 5 can send an indication to the control plane subsystem 203. In response to receiving the indication, the control plane subsystem 203 (e.g., the NSSF 226) can dissociate one or more additional network slices with the wireless device 502 and/or the UPF 216 can increase the portion of the data packets transmitted through the 5G wireless connection 524.

In some implementations, the L4S technology can be applied to detect reduced service performance in the additional network connections (e.g., the network connections 525, 522, and 520). In such implementations, in an instance that the control plane subsystem 203 of FIG. 5 detects a risk of reduced performance, the action performed by the control plane subsystem 203 in response to the request received from the L4S application server 516 can include associating one or more additional network slices 518 to the wireless device 502 to increase network bandwidth and/or increase a portion of data packets transmitted through the 5G wireless connection UPF 216 or other additional network connections, while decreasing a portion of data packets transmitted through the network connection and decrease a portion of data packets transmitted through the network connection experiencing the risk of reduced performance.

In some implementations, the L4S application server can reduce a portion of sending the data packets to the wireless device via the DN subsystem in response to receiving the respective data packet including the ECN. For example, the L4S can perform such a reduction in response to receiving the L4S feedback message and/or in an instance that no additional 5G network slices can be associated with the wireless device 502. For example, the NSSF 226 of system 500 sends an indication to the L4S application server 516 that no additional network slices are associated with the wireless device 502. In response to receiving such an indication, the L4S application server 516 reduces the rate of sending data packets to the wireless device 502.

In some implementations, the L4S operations (e.g., acts 608 through 618) can be performed in combination with network aggregation operations (e.g., act 606) without applying network slicing (e.g., acts 602 and 604). For example, the UPF 216 in FIG. 5 generates the aggregated wireless connection 526 by augmenting a 5F network connection (without network slicing) with one or more additional network connections selected from the 5G wireless connection 525, the Wi-Fi connection 522, and the IPTV network connection 520. In such instances, the action performed by the control plane subsystem 203 in response to the request received from the L4S application server 516, the UPF 216 can increase or decrease a portion of data packets transmitted through the 5G wireless connection and increase a portion of data packets transmitted through the one or more additional network connections (e.g., wireless connections 525, 522, and/or 520) for preventing reduced service performance in the 5G wireless connection.

In some implementations, the L4S operations (e.g., acts 608 through 618) can be performed in combination with the network slicing operations (e.g., acts 602 and 604) without applying bandwidth aggregation (e.g., act 606). For example, the wireless device 502 in FIG. 5 can communicate with the L4S application server 516 through a 5G wireless connection through one or more network slices 518 between the wireless device 502 and the DN 220. In such implementations, the 5G wireless connection is not augmented with any of the other network connections such as the network connections 525, 522, or 520.

In some implementations, the network slicing operations (e.g., acts 602 and 604) can be performed in combination with bandwidth aggregation operations (e.g., act 606) without applying L4S operations (e.g., acts 308 through 618). For example, an application server (other than the LS4 application server 516) can detect a degradation of its application to network conditions. The application server can request the network slices modification through the NEF 222 that can forward the request to the NSSF 226 in FIG. 2.

Computer System

Figure 7:
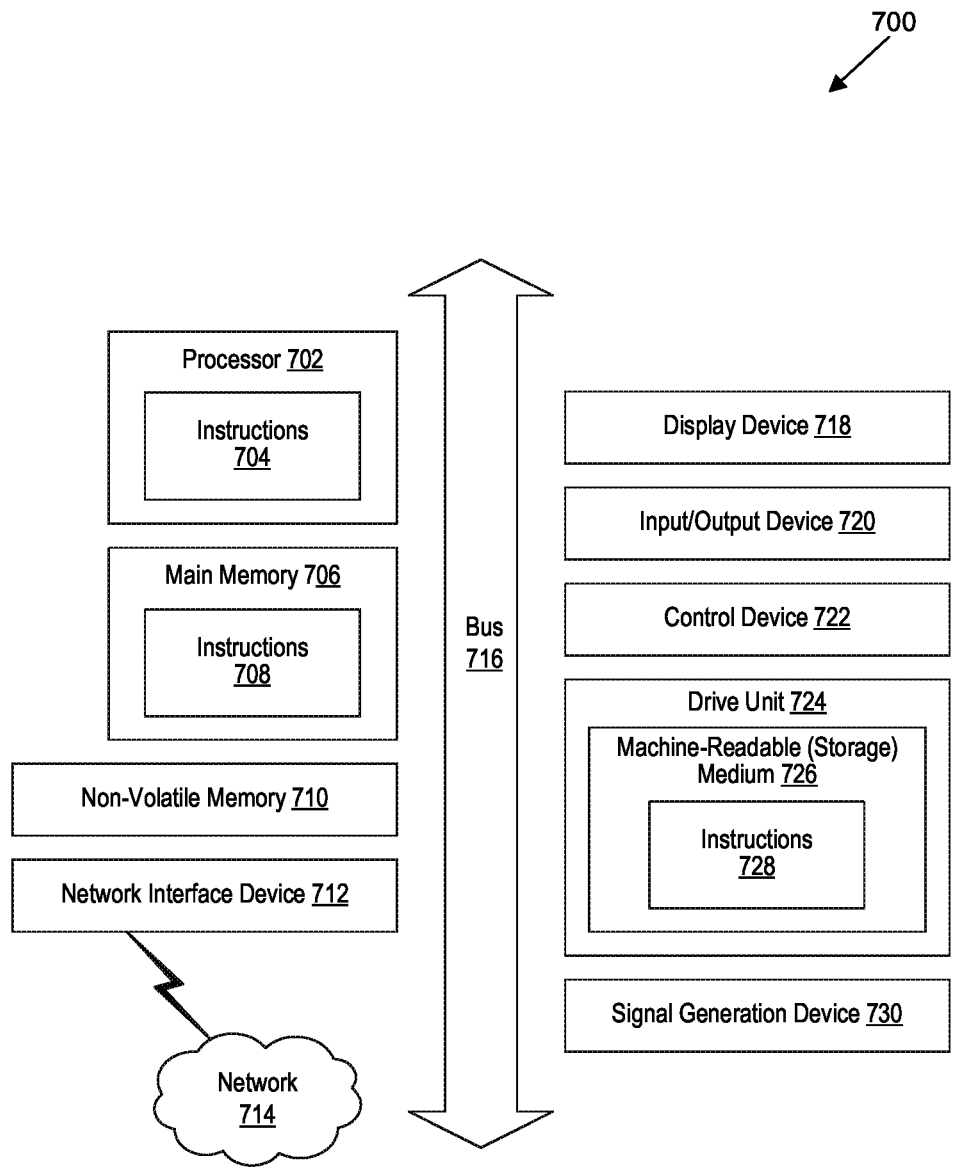
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC) or a distributed system, such as a mesh of computer systems, or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for optimizing 5G telecommunications network reliability, the method comprising:
    associating, by a 5G server system, a first network slice of a 5G telecommunications network with a wireless device;
    establishing, by the 5G server system, a 5G wireless connection between the wireless device and a data network (DN) subsystem,
        wherein the 5G wireless connection between the wireless device and the DN subsystem is through the first network slice;
    generating, by a user plane function (UPF) subsystem of the 5G network server system, an aggregated wireless connection between the UPF subsystem and the DN subsystem by augmenting the 5G wireless connection with one or more additional network connections;
    transmitting, by the DN subsystem and the UPF subsystem, data packets received from a Low Latency Low Loss Scalable Throughput (L4S) application server to the wireless device via the aggregated wireless connection and the 5G wireless network;
    detecting that the 5G wireless connection has a risk of experiencing reduced service performance;
    in response to the detection of the risk of experiencing reduced service performance, adding, by the DN subsystem or the UPF subsystem, an explicit congestion notification (ECN) to a respective data packet of the data packets;
    causing, by the 5G server system, the wireless device to forward, in response to receiving the respective data packet including the ECN, a feedback message to the L4S application server;
    receiving a request, by the 5G server system from the L4S application server, to perform an action to prevent reduced service performance in the 5G wireless connection; and
    performing the action by the 5G server system in response to receiving the request from the L4S application server.

2. The method of claim 1, wherein:
    the request from the L4S application server includes a request to associate one or more additional network slices with the wireless device, and
    the action performed by the 5G server system comprises associating, by the 5G server system, a second network slice with the wireless device so that the 5G wireless connection between the wireless device and the DN subsystem is through the first network slice and the second network slice.

3. The method of claim 1, wherein:
    the request from the L4S application server includes a request to associate one or more additional network slices with the wireless device, and
    the action performed by the 5G server system comprises:
        determining that the 5G server system cannot associate any additional network slices with the wireless device;
        in response to the determination that the 5G server system cannot associate any additional network slices with the wireless device, forgoing associating the one or more additional network slices with the wireless device; and
        reducing, by the UPF subsystem, a rate of data packets routed through the 5G wireless network and increasing a rate of data packets routed through the one or more additional network connections.

4. The method of claim 1, wherein the action performed by the 5G server system comprises:
    determining whether the wireless device is authorized to establish a wireless connection with any additional network slices in addition to the first network slice.

5. The method of claim 1, wherein the action performed by the 5G server system comprises:
    determining whether any other additional network slices of the 5G telecommunications network has bandwidth to transfer data packets without a risk of causing reduced service performance at the respective additional network slices.

6. The method of claim 1, wherein the one or more additional network connections are selected from:
    an additional 5G wireless connection,
    a Wi-Fi or Ethernet network connection, or
    an Internet Protocol Television (IPTV) network connection.

7. The method of claim 1, wherein:
    the wireless device includes a first network interface configured to communicate with the UPF subsystem via a 5G radio access network (RAN) node, and
    a second network interface configured to communicate with the UPF subsystem via the 5G RAN node, a wireless local area network access point (WLAN AP), or Data Over Cable Service Interface Specification radio guide (DOCSIS RG) node.

8. The method of claim 1, wherein:
    the wireless device is a mobile device, a laptop, a wearable device, an unmanned aerial vehicle, an autonomous transportation device, a robotic devices, an AR/VR device or a security system device.

9. The method of claim 1, further comprising:
    causing the L4S application server to reduce a rate of sending the data packets to the DN subsystem in response to receiving the respective data packet including the ECN.

10. The method of claim 1, wherein adding the ECN to the respective data packet of the data packets comprises:
    adding a marker comprising a particular bit code to a header of the respective data packet.

11. The method of claim 1 further comprising:
    transmitting, by the DN subsystem and the UPF subsystem, data packets received from the L4S application server to the wireless device via the aggregated wireless connection and the one or more additional network connection concurrently with transmitting the data packets via the aggregated wireless connection and the 5G wireless network.

12. The method of claim 1, wherein:
the data packets received from the L4S application server are transmitted through the aggregated wireless connection from the DN subsystem to the UPF subsystem and via the 5G wireless network from the UPF subsystem to the wireless device.

13. The method of claim 1 further comprising, prior to associating the first network slice of the 5G telecommunications with a wireless device:
determining, by the 5G server system, whether the wireless device is authorized to communicate through the first network slice based on a service subscription associated with a user of the wireless device.

14. A computer-implemented method for optimizing 5G telecommunications network reliability, the method comprising:
associating, by a 5G server system, a first network slice of a 5G telecommunications network with a wireless device;
establishing, by the 5G server system, a 5G wireless connection between the wireless device and a data network (DN) subsystem,
wherein the 5G wireless connection between the wireless device and the DN subsystem is through the first network slice;
transmitting, by the DN subsystem and a user plane function (UPF) subsystem, data packets received from a Low Latency Low Loss Scalable Throughput (L4S) application server to the wireless device via the 5G wireless connection;
detecting that the 5G wireless connection has a risk of experiencing reduced service performance;
in response to the detection of the risk of experiencing reduced service performance, adding, by the DN subsystem or the UPF subsystem, an explicit congestion notification (ECN) to a respective data packet of the data packets;
causing, by the 5G server system, the wireless device to forward, in response to receiving the respective data packet including the ECN, a feedback message to the L4S application server;
receiving a request, by the 5G server system from the L4S application server, to perform an action to prevent reduced service performance in the 5G wireless connection; and
performing the action by the 5G server system in response to receiving the request from the L4S application server.

15. The method of claim 14, wherein:
the request from the L4S application server includes a request to associate one or more additional network slices with the wireless device, and
the action performed by the 5G server system comprises associating, by the 5G server system, a second network slice with the wireless device so that the 5G wireless connection between the wireless device and the DN subsystem is through the first network slice and the second network slice.

16. The method of claim 14, wherein:
the action performed by the 5G server system comprises determining whether the wireless device is authorized to establish a wireless connection with any additional network slices in addition to the first network slice.

17. The method of claim 14, wherein the action performed by the 5G server system comprises:
determining whether any other additional network slices of the 5G telecommunications network has bandwidth to transfer data packets without a risk of reduced service performance at the additional network slices.

18. The method of claim 14 further comprising:
causing the L4S application server to reduce a rate of sending the data packets to the DN subsystem in response to receiving the respective data packet including the ECN.

19. A server system comprising a data network (DN) subsystem and a user plane function (UPF) subsystem for optimizing a telecommunications network reliability, the server system comprising:
at least one hardware processor; and
at least one non-transitory memory storing instructions, which, when executed by the at least one hardware processor, cause the server system to:
associate, by a server system, a first network slice of a telecommunications network with a wireless device;
establish, by the server system, a wireless connection between the wireless device and the DN subsystem,
wherein the wireless connection between the wireless device and the DN subsystem is through the first network slice;
generate, by the UPF subsystem, an aggregated wireless connection between the UPF subsystem and the DN subsystem by augmenting the wireless connection with one or more additional network connections;
transmit, by the DN subsystem and the UPF subsystem, data packets received from an application server associated with a data packet throughput management system to the wireless device via the aggregated wireless connection and the wireless network;
detect that the wireless connection has a risk of experiencing reduced service performance;
in response to the detection of the risk of experiencing reduced service performance, add, by the DN subsystem or the UPF subsystem, a congestion indication to a respective data packet of the data packets;
cause, by the server system, the wireless device to forward, in response to receiving the respective data packet including the congestion indication, a feedback message to the application server;
receive a request, by the server system from the application server, to perform an action to prevent reduced service performance in the wireless connection; and
perform the action by the server system in response to receiving the request from the application server.

20. The system of claim 19, wherein:
the request from the application server includes a request to associate one or more additional network slices with the wireless device, and
the system is further caused to:
determine that the server system cannot associate any additional network slices with the wireless device,
in response to the determination that the server system cannot associate any additional network slices with the wireless device, forgo associating the one or more additional network slices with the wireless device, and
reduce, by the UPF subsystem, a rate of data packets routed through the wireless network and increasing a rate of data packets routed through the one or more additional network connections.

* * * * *